Oct. 15, 1968  G. MERSCH  3,405,571
PHASE DISPLACEMENT DEVICE OF TWO SHAFTS
Filed Nov. 17, 1965  3 Sheets-Sheet 1

Oct. 15, 1968   G. MERSCH   3,405,571
PHASE DISPLACEMENT DEVICE OF TWO SHAFTS
Filed Nov. 17, 1965   3 Sheets-Sheet 3
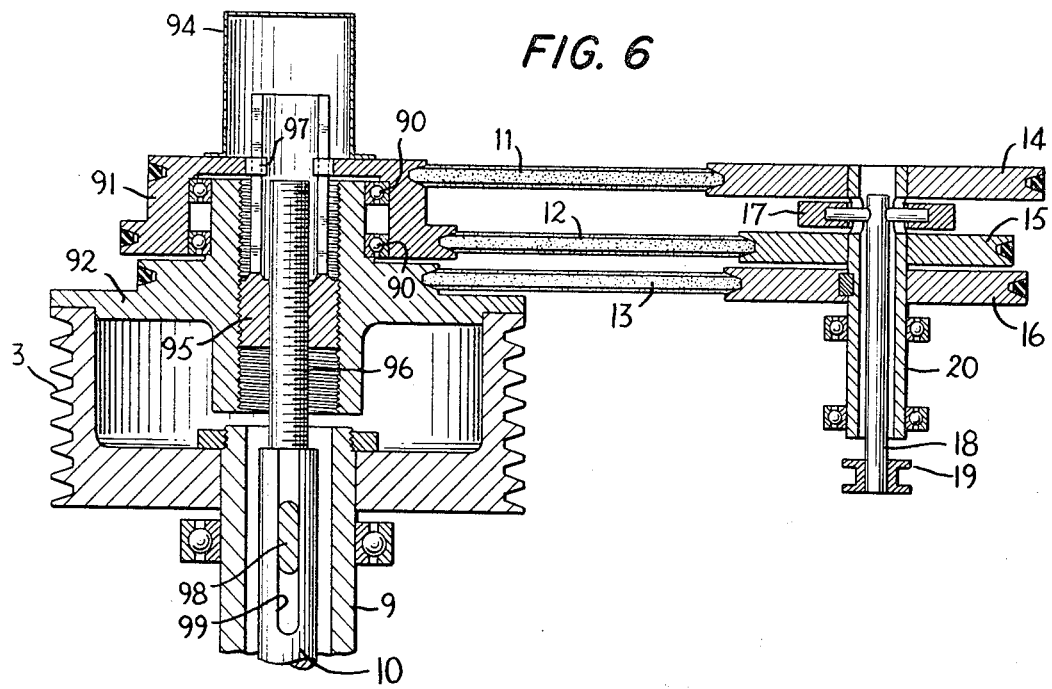
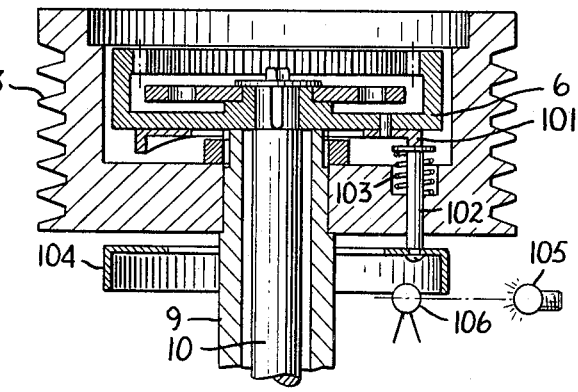
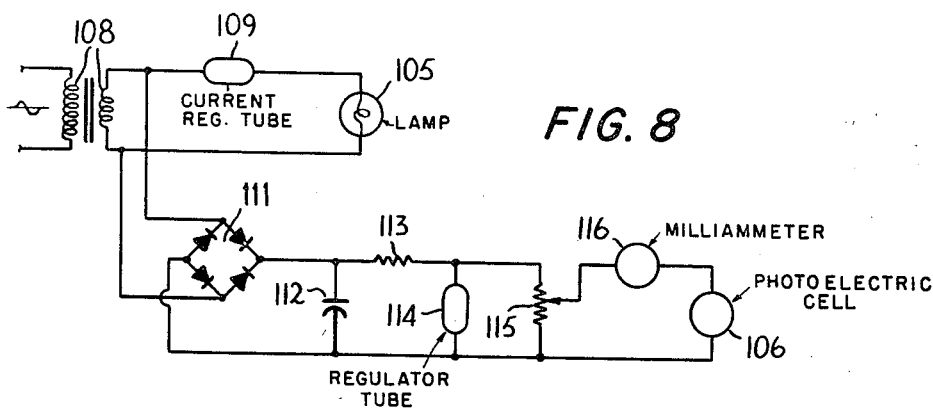

United States Patent Office 3,405,571
Patented Oct. 15, 1968

3,405,571
PHASE DISPLACEMENT DEVICE OF
TWO SHAFTS
Georges Mersch, 18 Rue Frans Liszt,
Luxembourg, Luxembourg
Filed Nov. 17, 1965, Ser. No. 508,311
Claims priority, application Luxembourg, Nov. 24, 1964,
47,431; Oct. 7, 1965, 49,600
14 Claims. (Cl. 74—674)

ABSTRACT OF THE DISCLOSURE

Apparatus having two shafts which normally rotate at the same speed comprises means for changing the phase relation between the shafts while rotating. The drive of the two shafts comprises a pulley or other driving member affixed to one of the shafts and means for coupling the second shaft with the drive means so that it normally rotates at the same speed but can temporarily be rotated slightly faster or slightly slower so as to change the phase relation between the two shafts. The mains for coupling the second shaft to the drive member includes torque limiting clutch means for causing the two shafts normally to rotate together and speed modifier means for temporarily accelerating or decelerating the second shaft relative to the first shaft. The phase modifying means includes a rotatable phase shifting member concentric with the shafts and means for temporarily and selectively rotating the phase shifting member at a speed higher or lower than the speed of the drive member. Power for rotating the phase shifting member is derived either from the main drive member through a suitable variable speed drive or is provided by a separate power source, for example an electric motor. Speed reducing means between the phase shifting member and the second shaft may be in the form of a planetary gear system or a differential screw system. Means is also preferably provided for indicating the phase relationship between the two shafts. The phase indicating means is disclosed as comprising an electric circuit with a variable resistance photocell and means for varying the illumination of the cell in accordance with the phase angle betwen the two shafts.

---

Many apparatuses comprise a device enabling modification of their characteristics while they are rotating. This applies particularly to: aeroplane propellers, hydraulic turbine rotors, ventilators or pumps, mixers or dispersers. Generally, the relative operating motion is obtained by the drive or axial displacement of a component disposed on the rotating shaft, said component remaining stationary and unrotating relative to rotating shaft because it is mounted on to a device such as a bearing or bearing which carries the axial thrust during said axial displacement. Said axial movement is then directly utilised or converted into relative rotation of the drive shaft by any of the numerous known devices such as: helical grooves, sets of levers, rack and pinion with conical gears, helical gears. But experience has shown that such axial displacement devices generate axial thrusts which may be important and complicate the conception and execution of the bearing brackets. Furthermore, they often require special balancing precautions, particularly when the basic rotation is fast.

The present invention aims at creating a relative motion device, which is hereinafter termed "dephasing motion" or "dephasing," that is to say a modification of the peripheral speed of two shafts, preferably rotating, concentric and under power load, through an adjustable peripheral action, that is to say positive, negative or nil, permanent or temporary, producing directly or indirectly the desired effect, whether there be required a relative rotation or a final axial motion, and this without axial thrust.

For such purposes, the control of this relative motion is obtained by the addition or subtraction of a peripheral and non axial drive speed, originating preferably from the basic movement through the intermediary of an adequate mechanism or again obtained from an exterior source of movement.

The devices of the present invention may be adapted to a multitude of apparatuses of which it is desired to modify certain characteristics while in operation. As examples may be mentioned axial and centrifugal ventilators, axial and centrifugal pumps, aviation and marine propellers, machine-tools, mixers and kneaders for all industries, axial or centrifugal compressors, hydraulic turbines.

In the following text shall be distinguished the following motions (a) basic movement corresponding to the rotation of the aggregate, such movement transmits in principle the power of the machine to the active component (impeller, propeller, etc.) although from a power viewpoint the functions of the different components may be inverted; (b) operating motion applying to the displaced shaft a motion relative to the basic movement. Said operating motion could be a translatory motion or a rotation with relation to basic movement; (c) drive motion which is the rotation motion which induces the operating motion after an eventual conversion.

The operating motion should normally be very slow, as the relative motion of the adjustment component with relation to shaft is slow. Therefore, the drive motion whether it is slow or fast is eventually converted.

The drive motion may be derived from the basic movement or originate from any convenient exterior source, providing it does act as a rotation added or subtracted from the basic movement, to procure the desired effect.

If the drive motion is slow, it may be assimilated to the operating motion.

If the drive motion is fast, it is generally converted through a high ratio reducer to attain the appropriate operating motion. In such case, the strains required to obtain the drive motion may be remarkably weak, making such type of new device of particular interest for remote regulation or control problems.

In the following figures have been represented a certain number of examples illustrating the application of the principle. Such examples are not limitative and show the application of the principle to devices requiring a rotative and sliding (or axial) operating motion.

FIGURE 6 is a sectional view of the device according to the FIG. 1 with axial operating motion.

FIGURE 7 shows a remote control device.

FIGURE 8 shows diagrammatically a wiring arrangement of device according to FIG. 7.

Figure 1:
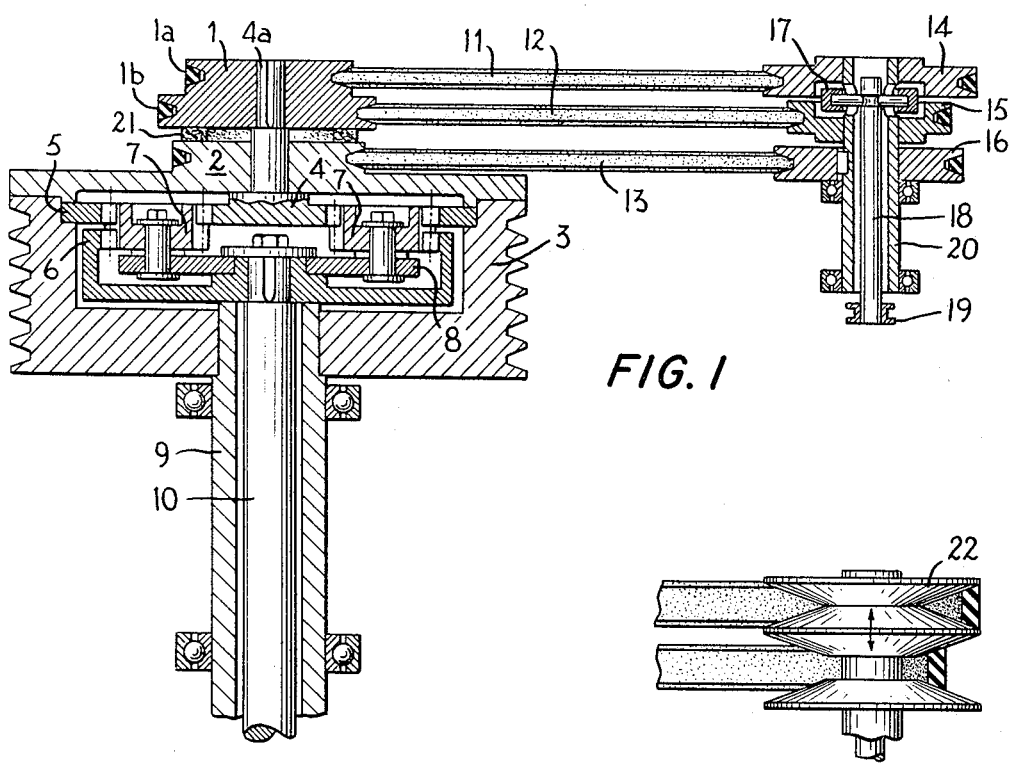
FIGURE 1 is a sectional view of the fast drive device with distinct coupling.

The principle of the invention is more specifically defined hereafter with reference to FIG. 1 illustrating specific components of one of the devices: the invention encompasses the combination of a certain number of means, known or not, to form the device or devices producing the desired effect. Such means are (FIG. 1):

(1) A power taking means here constituted by a pulley 2 mounted on a hollow shaft 9 and connected to a pulley 16 by a belt 13.
(2) A power receiver means, such as the pulley 16.
(3) A power transfer means, such as hollow shaft 20.
(4) A power return means at differential speeds, such as the two pulleys 14 and 15 of different diameters.
(5) A power receiver means of the power return at differential speeds, such as a multi-stage pulley 1 with one or two grooves of different diameters, connected to two pulleys 14 and 15, by belts 11 and 12 or the like.
(6) A power return means coupling means represented by a clutch 17 and its control rod 18.
(7) A power return reception means coupling means represented by a torque limiting clutch 21, and eventually a pressure means such as a spring (unrepresented).
(8) A rotative speed modifier means, represented by planetary devices 4, 5, 6, 7 and 8, where lodged in the receiving pulley.
(9) To such means may be combined a dephasing indicator means (FIGS. 7 and 8), preferably at a distance.

As already indicated, when the drive motion is fact, the invention provides for the inclusion of an appropriate reducer in the above combination of means, providing a slow operating motion of high motor torque, the drive torque being very weak which is particularly convenient for remote or servo-drive apparatuses. FIG. 1 shows an example of such a device providing a slow rotating motion originated by a fast drive motion.

A tubular shaft 9, driven by the basic movement, transfers the power to the machine operating tool (propeller, wheel . . . ); such power is provided by a grooved pulley 3 connected to a motor, for example, by belts. Said pulley 3 is hollow and comprises a planetary reducer; it is closed by a lid comprising a pulley 2. The device is completed by a return component comprising a hollow shaft 20 on which is locked pulley 16 of same diameter as pulley 2.

Shaft 20 therefore rotates at same speed as shaft 9, since pulleys 2 and 16 are connected by belt 13. Above pulley 2 is located a multi stage pulley 1, locked to the sun pinion shaft 4a of the planetary gear. Said pulley is connected by belt 11 and 12 to pulleys 14 and 15 loose-mounted on hollow shaft 20. A clutch 17 actuated by rod 18 and thrust collar 19 enables coupling of shaft 20 with pulley 14 or with pulley 15. The pulley 1 is coupled by a torque limiting clutch shown as a disc 21 onto pulley 2 so that, when clutch 17 is disengaged, there is no relative motion of sun pinion 4. The torque of clutch 21 is adjusted so that it may easily be overruled by the clutching torque 17 but insures irreversability with respect to any normal torque originating from the operating shaft 10.

In operation, clutch 17 is in neutral position and there is no relative motion of the aggregate mounted onto shaft 9; all components are driven by the basic movement and the operating motion is nil.

If rod 18 is pushed upwards, clutch 17 locks pulley 14 onto shaft 20. Pulleys 16 and 14 are thus linked: as a result of the diameter differential of pulleys 16 and 14, pulley 1 will rotate faster than pulley 3. A drive speed is thus applied through shaft 4a to sun pinion 4. This differential drive speed, considered as very fast, for example 50 r.p.m., is considerably reduced by the planetary combination 4, 5, 6, 7, 8 so that an extremely slow and accurate differential drive motion is imparted to shaft 10 which will displace in one direction the adjustable tool carried by shaft 9.

As soon as clutch 17 is returned to neutral position, pulley 1 is again clutched by disc 21 onto pulley 2 and the drive and operating motions are arrested: the adjustable tool carried by shaft 9 remains in the position it has been brought to, since the clutch 21 insures irreversibility with respect to any normal torque applied to shaft 10. The clutch 21 thus also acts as a safety maximum torque limitator applicable to the adjustable tool.

If rod 18 is pulled downwards, pulley 15 is engaged onto shaft 20; pulleys 15 and 16 rotate at the same speed but because of the diameter differential of said pulleys 15 and 16, pulley 1 rotates slower than the basic movement. This results in a differential drive speed of sun pinion 4 in the opposite direction to preceding case; said speed is also reduced by the planetary gears and induces a slow operating motion, with high torque directed in the opposite direction to prior case.

The planetary reducer is built so as to obtain a high reduction ratio with a minimum of simple components. It comprises a sun input pinion 4, two continuous straight gear satellites 7, carried by the ring 8, a fixed crown 5 locked to main pulley 3 and a mobile output crown 6 locked to shaft 10. The fixed crown 5 and the mobile crown 6 have a large number of teeth; the difference in the respective number of teeth is two (for example 100 teeth and 98 teeth) and the teeth are offset so as to mesh without important play with the continuous straight satellite gears. This produces a very compact reducer with a very high ratio (for example 350/1) in a single reduction stage.

The speed reducer could also be positioned for example in the motor pulley or in any other appropriate position; it may be otherwise engineered, such as in the form of a worm gear, without modifying the invention.

It shall be noted that the power return is actuated from the main pulley 3. This arrangement has the advantage to maintain the adjustment possibility even with slippage of the power transmission belts. It is obvious that if between the motor and pulley 3 is used a non-slip transmission means (link belts, chains, gears) the power return may be positioned on the motor shaft.

It will be noted that excepting during the drive motion, there is no relative motion of components subjected to stress. This is very interesting as it insures negligible wear of the mechanism parts.

There is no axial thrust, which is favorable to good bearing behaviour. The assembly is, engineering and construction wise, completely symmetrical. This facilitates balancing and cancels all operating stresses on bearing brackets.

Due to the very high demultiplication of the drive motion, the strains are extremely low, which enables easy remote drive without the use of a servomotor since the device receives its drive power from the basic movement of the machine. Remote drive requires only clutch 17 actuation of which can easily be done pneumatically, hydraulically or even mechanically. This avoids the use of an electrical device, which may be difficult and expensive when operating in explosive atmospheres.

Figure 2:
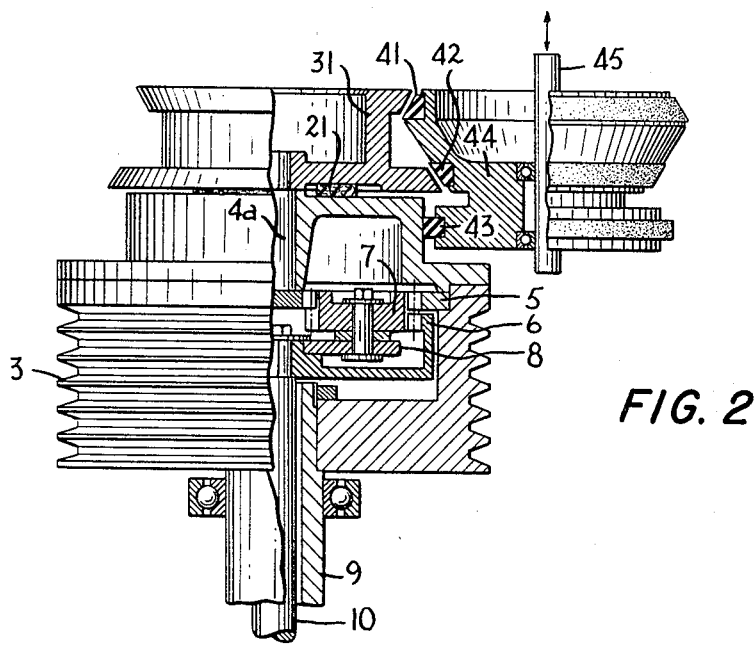
FIGURE 2 is a sectional view of the device according to FIG. 1 with biconical axial displacement drive.

FIG. 2 illustrates a variant of the preceding device in which the return belts and clutch return have been replaced by a biconical drum which is adjustable vertically. A main pulley 3 on hollow shaft 9 still comprises the planetary reducer device; on its input shaft 4a is positioned a drum 31 clutched to pulley 3 by a disc 21. The lid 32 of pulley 3 comprises a cylindrical portion the diameter of which equals the average mean diameters of the two conical runways on the drum 31. A drum 44 is frictionally rotated by a tire 43 engaging the lid 32. It further comprises two truncated cone tires 41 and 42 which may contact with the upper or lower runways of drum cone 31, by lifting or lowering of the shaft 45 on which drum 44 is mounted.

It will be seen that by displacing said shaft 45 upwards the drum 31 will be rotated at a speed higher than the basic speed. This results in a positive drive and a positive operating motion which is also very slow because of the reducer. If shaft 45 is displaced downwards, the drum 31 will receive a speed lower than basic speed, which results in a negative drive and operating speed.

Because of the low drive stresses to be transmitted, a mere rubber to cast-iron friction suffices.

Figure 3:
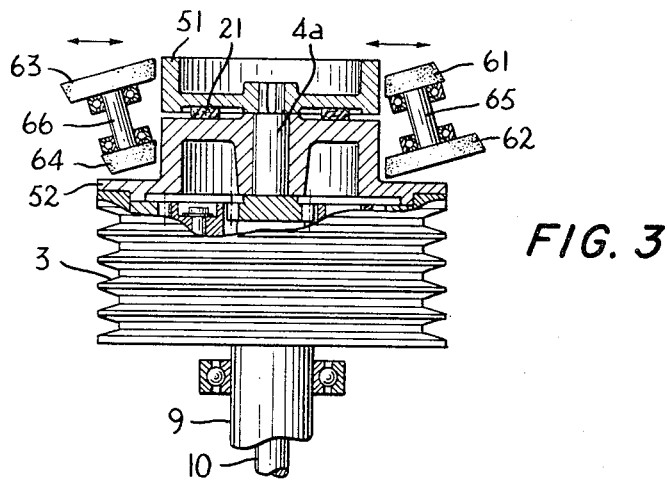
FIGURE 3 is a sectional view of the device according to the FIG. 1 with conical radial displacement rollers.

FIG. 3, shows another variant. The lid 52 of pulley 3 has a cylindrical surface. A reducer input shaft 4a carries a cylindrical pulley 51 of same diameter as the lid. As in FIG. 1, a disc 21 couples the motion of part 51 with relation to part 52.

The power return assembly here comprises two small intermediate shafts 65 and 66 together displaceable to the right or left. Said small shafts are slightly inclined with respect to main shaft and each carries two small discs with hard-rubber truncated cone tires 61 and 62 on shaft 65 and 63 and 64 on shaft 66. In neutral position neither of the tires make contact with the cylinders of parts 1 and 2, there is therefore no drive nor operating motion.

When shafts 65 and 66 are displaced toward the right, the tires 63 and 64 contact parts 51 and 52 and, because of the tire diameter differentials, produce a speed increase of pulley 51, which introduces drive motion and, furthermore, by speed reduction, a positive operating motion.

When shafts 65 and 66 are displaced toward the left, the tires 61 and 62 contact parts 51 and 52 and the speed of part 51 decreases below basic speed and a negative drive and corresponding operating motion are introduced.

It is unnecessary to displace both shafts 65 and 66 together. However, if this is not done, a safety locking device is required to avoid pressing both shafts against the cylinders 51 and 52 at the same time.

It will be noted that the described devices produce a temporary dephasing, which stops as soon as the drive impulse ends. Moreover, the dephasing may be either positive or negative. Such devices thus provide fully adjustable phase control.

Figure 1A:
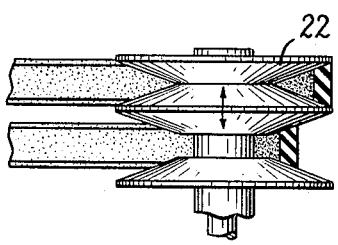
FIGURE 1a is a detail view of extensible pulleys.

Nothing would be changed if the pulleys 14 and 15 and pulleys 1 and 2 of FIG. 1 were replaced by variable pulleys 22 as illustrated in FIG. 1a. This provides only a continuous motion, which it is necessary to invert to return to dead-point.

Figure 4:
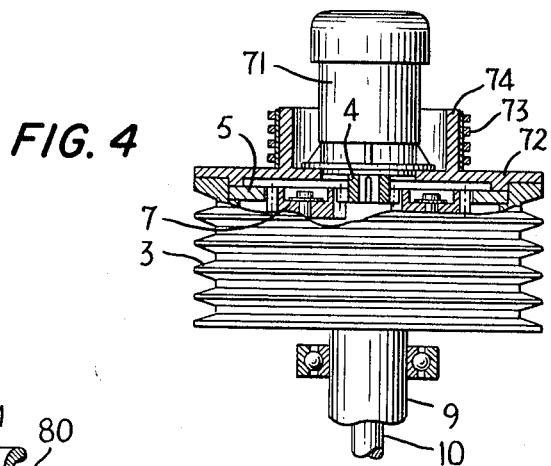
FIGURE 4 is a sectional view of the device according to the FIG. 1 with rotary motor drive.

FIG. 4, illustrates a variant in which the drive motion is not derived from the basic movement but is obtained by a small servomotor 71 positioned on lid 72 of the main pulley 3. Such servomotor may be a small two phase motor with a large number of pole pairs, of wholly symmetrical construction and affixed to a flange on the lid 72. The motor speed is relatively slow. It directly drives the sun pinion 4 of the planetary reducer already described. Electric feed is supplied by a set of brushes applied to rings 73 mounted on an upstanding collar 74 of lid 72.

When there is no signal, the motor does not rotate and the whole assembly follows the basic movement. When the small motor 71 is fed, drive rotation is produced and the operating motion acts through the planetary reducer shaft 10. When the sequence of motor feeding phases is inverted, it rotates reversely and produces, after demultiplication, and operating motion which is the reverse of the preceding one.

Figure 5:
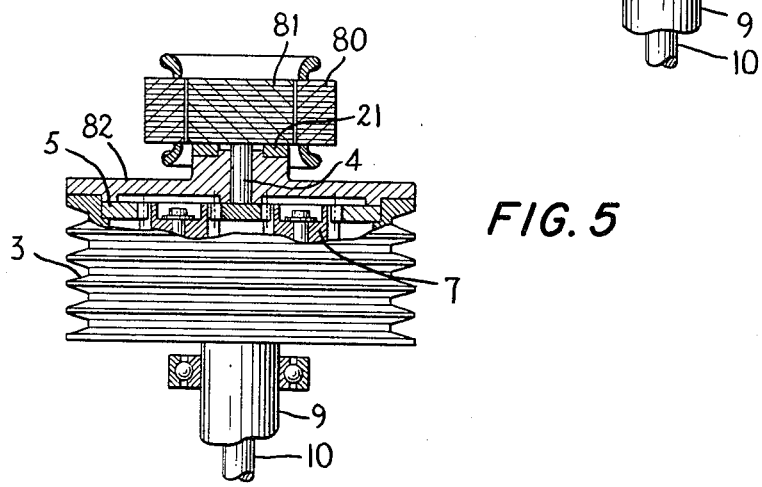
FIGURE 5 is a sectional view of the device according to the FIG. 1 with special fixed-stator servomotor.

FIG. 5 illustrates another electric motor drive means which facilitates balancing and does away with inconveniences of brush and ring feeding, for example in explosive atmospheres.

The fixed stator 80 of the drive motor comprises several three phase windings similar to those used in two speed asynchronous motors. According to the coupling of the pole pairs, two synchronous speeds of the induced rotating field are obtained. A squirrel cage rotor 81 concentric with the stator axis is directly coupled to input sun pinion 4 of planetary reducer. The basic movement speed is chosen equal to the average synchronous speeds of the motor.

In normal operation, the assembly rotates at the basic speed and the clutch 21 couples the rotor 81 with the lid of pulley 3. When the stator windings of the motor are excited so as to produce a field rotating at the first synchronous speed, the rotor 81 will rotate, in space, at a speed very close to field rotation, as the slippage is very small. This produces a drive motion speed equal to the difference of said synchronous speed and of the average positive direction speed of pulley 3, which induces, after reduction, a positive operating motion.

When the stator windings are excited so as to produce a field rotating at the second synchronous speed, the rotor 81 will rotate, in space, at a speed close to the second field speed. This produces a drive motion speed equal to the difference of said synchronous speed and of the average negative direction speed which induces a corresponding negative operating motion.

It is possible to improve the scheme by effecting disengagement of the clutch 21 when exciting the motor stator, as is done in certain brake-motors.

In some cases, it may be advantageous to provide an axial operating motion for regulation of the adjustable tool carried by the rotating machine. In such a case, also, the regulation system by addition or subtraction of a peripheral speed provides a considerable reduction of the axial stresses on the bearing brackets by confining all stresses in the rotating assembly. It further provides facilities for the remote or servodrive by requiring only very slight drive stresses as has been earlier stated.

FIG. 6 illustrates such a device.

Pulley 3 carries the motor power and drives the general basic movement. As in FIG. 1, the pulley 3 is locked to tubular shaft 9 and carries the lid 92 provided with a groove for a belt 13 which drives a pulley 16 at the basic speed also. The reversing shaft 20 locked to pulley 16 carries a clutch 17 and two loose pulleys 14 and 15 as already described.

The lid 92 carries a multistage pulley 91 which is rotatably supported on an upward extension of the lid by bearings 90 and is provided with two engaging dogs 97 engaged in the two grooves of a nut 95. Said nut 95 is provided with two very slightly different interior and exterior threadings. The exterior threading engages with the interior threading of lid 92 while interior threading engages a threaded upward extension 96 of the inner shaft 10. The shaft 10 is movable relative to the hollow shaft 9 with an axial motion. A lock-pin 98 engaged in a slot 99 in the shaft 10 permits such motion, while preventing rotation of shaft 10 relatively to tube 9. A cop 94 closes the multistage pulley and makes the assembly tight.

The operation of the device is based on the known prinicple of differential threads, permitting a very wide speed demultiplication which replaces the planetary assembly of the apparatus shown in FIGS. 1 to 5.

It will be noted that in the embodiment of FIG. 6 all axial thrust is carried by the part 92 and that no axial thrust is transfered to bearings.

It will be seen that the various described embodiments comprise the combination of means of the invention although said means may appear in varied shapes. It will be understood that the means constituting the invention could be still otherwise modified as to shape, if they accomplish the same action, without modifying the invention.

As already stated, the heretofore described invention means may be further combined, together or separately, with additional means comprising a remote reading means indicating the displacement effected during the dephasing. Hereafter is described such means, with reference to FIGS. 7 and 8.

The invention comprises a device enabling the reading of the angular position of one shaft relative to the other, during rotation and without material contact with the rotating assembly.

For this purpose, the main shaft carries an annular screen of which the axial position indicates the angular displacement between the main shaft and operating motion of the central shaft. To obtain such axial travel from the operating motion it is only required to use a cam, helical gradient, sets of levers or any other system providing the same effect.

The annular screen travels in front of a photosensitive cell and modifies the illuminated area of the cell in proportion to the phase displacement of the shafts. Such modification of illuminated area induces a modification of electric characteristics which may be transmitted as far as desired by suitable circuitry. FIG. 8 schematically illustrates the circuit of the indicating device of the assembly of FIG. 7.

As the shaft 10 is actuated by the operating motion to perform a control function, angular displacement of shaft 10 relative to main tubular shaft 9 is to be indicated. On the crown 6 carried by shaft 10 there is provided a rim 101 having a helical slope. In the pulley 3 carried by shaft 9 slide rods 102 which are held in engagement with cam slope 101 by springs 103 while said rods carry an annular screen 104. It is thus seen that the angular position of the shaft 10 relative to shaft 9 is indicated by the axial position of the screen 104.

A depending cylindrical edge portion of screen 104 is positioned between a lamp 105 and a photoelectric cell 106 of which the lighted area is thus proportional to the phase relation of shafts 9 and 10.

The system is devised to provide phase indication whatever the basic rotation speed of shaft 9.

An electrical measuring circuit is illustrated in FIG. 8. A transformer 108 feeds two circuits: the lighting circuit and the measuring circuit. The lighting circuit comprises a lamp 105 and a current regulating tube 109 which is required to maintain a fixed lighting, independent of feed voltage fluctuations. The measuring circuit comprises a full wave rectifier system 111, a filtering capacity 112, a voltage regulator represented by a resistance 113 and a regulator tube 114. A voltage divider 115 allows adjustment of the voltage supplied to the photosensitive cell 106, while the milliammeter 116 measures the current flowing through the cell.

The lighting variations of the cell 106 according to the axial position of screen 104 modify its resistance. Indication of the milliammeter is therefore proportionate to dephasing between shafts 9 and 10. As the current flow through the cell is very low, the cell may be positioned at a great distance from the indicator represented by the milliammeter 116. This enables remote and precision measurement of the dephasing between the two shafts.

What I claim is:

1. Means for driving two concentric shafts normally at the same speed and for shifting the phase relation between said shafts to perform a control function, comprising rotating drive means, first coupling means coupling a first one of said shafts with said drive means to rotate therewith, second coupling means including torque limiting clutch means for connecting the second one of said shafts with said drive means normally to rotate therewith at the same speed as said first shaft, and modifier means for temporarily accelerating or decelerating said second shaft to shift the phase relationship of said shafts relative to one another including a rotatable phase shifting member concentric with said shafts and normally rotating with said drive means, means for temporarily and selectively rotating said phase shifting member at a speed higher or lower than the speed of said drive means and thereby temporarily producing relative rotative movement between said phase shifting member and said drive means, and means including speed reducing means for connecting said phase shifting member with said second shaft to rotate said second shaft temporarily relative to said first shaft and thereby change the phase relationship of said shafts.

2. Driving means according to claim 1, in which said drive means comprises a hollow pulley fixed to said first shaft and said speed reducing means comprises a planetary gear set housed in said hollow pulley and having an input connected with said phase shifting member and an output connected with said second shaft.

3. Driving means according to claim 1, in which said torque limiting means comprises a friction clutch between said drive means and said phase shifting member.

4. Driving means according to claim 1, in which said means for rotating said phase shifting member comprises variable speed means connecting said phase shifting member to said drive means.

5. Driving means according to claim 4, in which said variable speed means comprises a counter shaft, means for driving said counter shaft from said drive means and variable speed drive from said counter shaft to said phase shifting member.

6. Driving means according to claim 5, in which said variable speed drive comprises two pulleys of different diameters free on said counter shaft, belts connecting said pulleys with said phase shifting member and clutch means for selectively connecting said pulleys with said counter shaft.

7. Driving means according to claim 5, in which said variable speed drive comprises variable speed pulleys.

8. Driving means according to claim 4, in which said phase shifting member has two annular friction drive surfaces of different diameter and in which said variable speed means comprises a drum driven from said drive means and having annular friction drive surfaces engageable selectively with said friction drive surfaces of said phase shifting member.

9. Driving means according to claim 4, in which said drive means and phase shifting member have coaxial cylindrical surfaces and in which said variable speed means comprises two counter shafts having friction rollers of different diameters and means for selectively bringing the rollers of one or the other of said counter shafts into engagement with said cylindrical surfaces.

10. Drive means according to claim 1, in which said means for rotating said phase shifting member comprises a servomotor.

11. Drive means according to claim 10, in which said servomotor comprises a two speed electric motor having a speed higher than and a speed lower than that of said drive means, and control means for selecting the speed of said motor.

12. Drive means according to claim 10, in which said speed reducing means comprises an internaly threaded member rotatable with said drive means, a coaxial differentially threaded screw rotatable with said second shaft and a differentially threaded nut rotatable with said phase shifting member, said nut having an internal thread of one pitch engaging said screw and an external thread of a different pitch engaging said internally threaded member.

13. Means for driving two concentric shafts normally at the same speed and for shifting said shafts relative to one another to perform a control function, comprising rotating drive means, first coupling means coupling a first one of said shafts with said driving means to rotate therewith, second coupling means for connecting the second one of said shafts with said drive means normally to rotate therewith at the same speed as said first shaft, and means for shifting the relationship of said shafts relative to one another including a rotatable shifting member concentric with said shafts and normally rotating with said drive means, means for temporarily and selectively rotating said phase shifting member at a speed higher or lower than the speed of said drive means and thereby temporarily producing relative rotative movement between said phase shifting member and said drive means, and means including speed reducing means for connecting said phase shifting member with said second shaft to move said second shaft temporarily relative to said first shaft and thereby shift the relationship of said shafts.

14. In combination with drive means according to claim 13, phase indicating means comprising a photoelectric cell, a light source illuminatng said cell, a displaceable screen between said light source and cell, means for displacing said screen in accordance with the phase relation of said first and second shafts to vary the illumination of said cell by said light source, and indicating means controlled by said cell.

References Cited

UNITED STATES PATENTS

| | | | |
|---|---|---|---|
| 1,657,991 | 1/1928 | Bowman | 74—690 |
| 2,986,952 | 6/1961 | Ward, Jr. | 74—675 X |
| 3,186,003 | 5/1965 | Gregory, et al. | 74—665 X |
| 3,263,523 | 8/1966 | Nash | 74—690 X |
| 3,290,961 | 12/1966 | Broderick | 74—665 |
| 3,312,126 | 4/1967 | Hering | 74—675 |

FRED C. MATTERN, JR., *Primary Examiner.*

A. T. McKEON, *Assistant Examiner.*